(12) United States Patent
Shimizu

(10) Patent No.: US 8,094,245 B2
(45) Date of Patent: Jan. 10, 2012

(54) DISPLAY SCREEN SUPPORT MECHANISM AND TELEVISION SET

(75) Inventor: Daisuke Shimizu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 370 days.

(21) Appl. No.: 12/428,781

(22) Filed: Apr. 23, 2009

(65) Prior Publication Data

US 2009/0268106 A1 Oct. 29, 2009

(30) Foreign Application Priority Data

Apr. 23, 2008 (JP) ................................. 2008-112255

(51) Int. Cl.
*A47G 23/02* (2006.01)

(52) U.S. Cl. ........ 348/836; 248/146; 248/917; 248/919; 361/679.22

(58) Field of Classification Search .................. 248/146, 248/159, 291.1, 292.14, 284.1, 917–923; 361/679.21, 679.22, 679.02, 679.01, 679.27, 361/679.29, 681–683; 348/836; 349/58–60
See application file for complete search history.

(56) References Cited

U.S. PATENT DOCUMENTS

| | | | | |
|---|---|---|---|---|
| 553,650 A * | 1/1896 | Kingsland | ..................... | 403/353 |
| 5,383,139 A | 1/1995 | Saji et al. | | |
| 5,894,633 A * | 4/1999 | Kaneko | ........................... | 16/306 |
| 7,243,397 B2 * | 7/2007 | Cho et al. | ......................... | 16/340 |
| 7,631,843 B2 * | 12/2009 | Makino | ....................... | 248/176.1 |
| 2002/0083554 A1 | 7/2002 | Lu | | |
| 2004/0217244 A1 | 11/2004 | Wu et al. | | |
| 2005/0268431 A1 | 12/2005 | Lo | | |
| 2007/0210220 A1 * | 9/2007 | Sawai et al. | ................. | 248/122.1 |
| 2007/0215760 A1 | 9/2007 | Sawai et al. | | |
| 2007/0215761 A1 | 9/2007 | Sawai et al. | | |

FOREIGN PATENT DOCUMENTS

| | | |
|---|---|---|
| JP | 6-297981 A | 11/1993 |
| JP | 2003-65320 A | 3/2003 |
| JP | 2007-193245 A | 8/2007 |
| JP | 2007-248542 A | 9/2007 |

OTHER PUBLICATIONS

European Office Action dated Feb. 2, 2011 (six (6) pages).
Japanese Office Action dated May 18, 2010 including English-language translation (Four (4) pages).
The Extended Search Report dated Dec. 1, 2009 (Six (6) pages).

* cited by examiner

*Primary Examiner* — Brian Glessner
*Assistant Examiner* — Beth Stephan
(74) *Attorney, Agent, or Firm* — Crowell & Moring LLP

(57) ABSTRACT

In a display screen support mechanism, a first hole portion receiving a platelike support shaft is provided in the form of a symmetrical sector formed by connecting two sectoral forward ends which are symmetric with respect to a hole center, and a display screen support member is rotatable about the platelike support shaft serving as a rotating shaft within an angular range of the symmetrical sectoral hole portion in a state where an end of the platelike support shaft in a longitudinal direction comes into contact with an arcuate inner peripheral surface of the symmetrical sectoral hole portion.

17 Claims, 9 Drawing Sheets

DISPLAY SCREEN SUPPORT MECHANISM AND TELEVISION SET

BACKGROUND OF THE INVENTION

1. Field of the Invention

The present invention relates to a display screen support mechanism and a television set.

2. Description of the Background Art

A display screen support mechanism capable of supporting a display screen such as a television set in a state inclined by a prescribed angle is known in general, as disclosed in each of Japanese Patent Laying-Open Nos. 2007-248542, 2007-193245 and 5-297981, for example.

The aforementioned Japanese Patent Laying-Open No. 2007-248542 discloses a display screen support mechanism comprising a display screen support member formed with a sectoral first hole portion, a base support member formed with a sectoral second hole portion and a platelike support shaft inserted into the first hole portion and the second hole portion. In this display screen support mechanism, the display screen support member is so formed as to rotate about an upper end or a lower end, serving as a rotation center, of the platelike support shaft in a longitudinal direction.

The aforementioned Japanese Patent Laying-Open No. 2007-193245 discloses a display screen support mechanism comprising a display screen support member formed with a sectoral first hole portion, a base support member formed with a rectangular second hole portion, and a platelike support shaft inserted into the first hole portion and the second hole portion. In this display screen support mechanism, the display screen support member is so formed as to rotate about an upper end of the platelike support shaft in a longitudinal direction.

The aforementioned Japanese Patent Laying-Open No. 5-297981 discloses an electronic apparatus (display screen support mechanism) comprising a display case (display screen support member), a body case (base screen support member) and a hinge unit connecting the display case and the body case and rotatably supporting these. The aforementioned Japanese Patent Laying-Open No. 5-297981 does not describe a specific structure of the hinge unit.

In the aforementioned display screen support mechanism described in Japanese Patent Laying-Open No. 2007-248542, however, in a case where inner side surfaces of the first and second hole portions come into contact with the support shaft when rotating the display screen support member about the upper or lower end, serving as the rotation center, of the support shaft in the longitudinal direction, a maximum moment acting on the support shaft from the inner side surfaces of the sectoral first and second hole portions of the display screen support member is a product of a distance between a first end, serving as the rotation center, of the support shaft in the longitudinal direction and a second end, on which force from the inner side surfaces of the first and second hole portions acts, of the support shaft in the longitudinal direction (overall length of the support shaft in the longitudinal direction) and force. Thus, the maximum moment acting on the support shaft is the product of the overall length of the support shaft in the longitudinal direction and the force, and hence the moment applied to the support shaft is increased. Consequently, the support shaft is disadvantageously damaged. Thus, durability of the support shaft is disadvantageously deteriorated.

In the aforementioned display screen support mechanism described in Japanese Patent Laying-Open No. 2007-193245, in a case where an inner side surface of the first hole portion comes into contact with the support shaft when rotating the display screen support member about the upper end, serving as the rotation center, of the support shaft in the longitudinal direction, a maximum moment acting on the support shaft from the inner side surface of the sectoral first hole portion of the display screen support member is a product of a distance between a first end, serving as the rotation center, of the support shaft in the longitudinal direction and a second end, on which force from the inner side surface of the first hole portion acts, of the support shaft in the longitudinal direction (overall length of the support shaft in the longitudinal direction) and force. Thus, the maximum moment acting on the support shaft is the product of the overall length of the support shaft in the longitudinal direction and the force, and hence the moment applied to the support shaft is increased. Consequently, the support shaft is disadvantageously damaged. Thus, durability of the support shaft is disadvantageously deteriorated.

In the aforementioned electronic apparatus described in Japanese Patent Laying-Open No. 5-297981, the body case and the display case can rotate about the hinge unit. Also in a case where such a hinge unit in the aforementioned Japanese Patent Laying-Open No. 5-297981 is formed by a rotatable platelike support shaft and applied to a display screen support member and a base support member having sectoral hole portions as in the aforementioned Japanese Patent Laying-Open No. 2007-248542 or 2007-193245, the display screen support member is rotatable with respect to the base support member. On the other hand, in a case where an inner side surface of the hole portion comes into contact with the support shaft when rotating the display screen support member about the upper end, serving as the rotation center, of the support shaft in the longitudinal direction, a maximum moment acting on the support shaft from the inner side surface of the sectoral hole portion of the display screen support member is a product of a distance between a first end, serving as the rotation center, of the support shaft in the longitudinal direction and a second end, on which force from the inner side surface of the hole portion acts, of the support shaft in the longitudinal direction (overall length of the support shaft in the longitudinal direction) and force. Thus, the maximum moment acting on the support shaft is the product of the overall length of the support shaft in the longitudinal direction and the force, and hence the moment applied to the support shaft is increased. Consequently, the support shaft is conceivably disadvantageously damaged. Thus, durability of the support shaft is conceivably disadvantageously deteriorated.

SUMMARY OF THE INVENTION

The present invention has been proposed in order to solve the aforementioned problems, and an object of the present invention is to provide a display screen support mechanism capable of improving durability of a support shaft.

A display screen support mechanism according to a first aspect of the present invention comprises a platelike support shaft, a display screen support member supporting a display screen portion and having a first hole portion receiving the platelike support shaft and a base support member provided on a side of a base and having a second hole portion receiving the platelike support shaft, wherein at least either one of the first and second hole portions receiving the platelike support shaft is provided in the form of a symmetrical sector formed by connecting two sectoral forward ends which are symmetric with respect to a hole center, and the display screen support member is rotatable about the platelike support shaft serving as a rotating shaft within an angular range of the symmetrical sectoral hole portion in a state where an end of the platelike support shaft in a longitudinal direction comes into contact with an arcuate inner peripheral surface of the symmetrical sectoral hole portion.

In this display screen support mechanism according to the first aspect, as hereinabove described, at least either one of the first and second hole portions receiving the platelike support shaft is provided in the form of the symmetrical sector formed by connecting the two sectoral forward ends which are symmetric with respect to the hole center, and the display screen support member is rotatable about the platelike support shaft serving as the rotating shaft within the angular range of the symmetrical sectoral hole portion in the state where the end of the platelike support shaft in the longitudinal direction comes into contact with the arcuate inner peripheral surface of the symmetrical sectoral hole portion, whereby the display screen support member rotates about the portion corresponding to the hole center of the symmetrical sectoral hole portion dissimilarly to a case where the hole portion of the display screen support member is provided in the form of the sector. Thus, a maximum moment applied to the support shaft in rotating the display screen support member is a product of a distance (½ of the overall length of the support shaft in the longitudinal direction) between the vicinity of the central portion, serving as the rotation center, of the support shaft corresponding to the symmetrical sectoral hole center and an end of the support shaft in the longitudinal direction and force, and hence the maximum moment (product of the distance between the both ends of the support shaft in the longitudinal direction and the force (the overall length of the support shaft in the longitudinal direction)) acting on the support shaft is substantially reduced by half in a case where the rotation center is the end of the support shaft. Consequently, the support shaft can be inhibited from damage, and hence durability of the support shaft can be improved.

In this case, the display screen support member is preferably rotatable about a rotation center which is in the vicinity of a central portion of the platelike support shaft corresponding to the hole center of the symmetrical sectoral hole portion within the angular range of the symmetrical sectoral hole portion. According to this structure, the rotational angular range of the display screen support member can be easily set by arbitrarily setting the angular range of the symmetrical sectoral hole portion.

In the aforementioned display screen support mechanism according to the first aspect, the display screen support member is preferably rotatable about the platelike support shaft serving as a rotating shaft in a state where both ends of an upper surface of the platelike support shaft come into contact with the arcuate inner peripheral surface of the symmetrical sectoral hole portion. According to this structure, the vertical load of the display screen is applied to the both ends of the upper surface of the platelike support shaft in any of the rotational angular range of the display screen support member, and hence the rotating operation of the display screen can be stabilized.

In the aforementioned display screen support mechanism according to the first aspect, a thickness of the platelike support shaft and a length of the support shaft on the hole center of the symmetrical sectoral hole portion in a thickness direction are preferably substantially the same. According to this structure, the rotating operation of the display screen can be stabilized.

In the aforementioned display screen support mechanism according to the first aspect, either one of the first hole portion and the second hole portion is preferably provided in the form of the symmetrical sector and the other is preferably provided in the form of a rectangle for regulating rotation of the platelike support shaft. According to this structure, the rotating operation of the display screen can be stabilized.

In this case, the display screen support member is preferably rotatable about the platelike support shaft serving as the rotating shaft in a state where both ends of an upper surface of the platelike support shaft come into contact with the arcuate inner peripheral surface of the symmetrical sectoral hole portion, and a lower surface of the platelike support shaft preferably comes into contact with the rectangular hole portion. According to this structure, rotation of the support shaft can be regulated by the rectangular hole portion and hence the display screen support member can be stably rotated about the support shaft serving as the rotating shaft.

In the aforementioned display screen support mechanism having the symmetrical sectoral hole portion and the rectangular hole portion, both ends of an upper surface of the platelike support shaft preferably come into contact with the arcuate upper inner peripheral surface of the symmetrical sectoral hole portion and a lower surface portion of the platelike support shaft preferably comes into contact with a lower surface of the rectangular hole portion, so that the lower surface portion of the rectangular hole portion receives a vertical load of the display screen portion. According to this structure, the display screen portion support member can be stably rotated about the support shaft serving as the rotating shaft while supporting the liquid crystal display portion by the lower surface of the rectangular hole portion.

In the aforementioned display screen support mechanism having the symmetrical sectoral hole portion and the rectangular hole portion, the first hole portion of the display screen support member is preferably provided in the form of the symmetrical sector and the second hole portion of the base support member is preferably provided in the form of the rectangle. According to this structure, rotation of the support shaft can be regulated by the rectangular second hole portion of the base support member and hence the rotating operation of the display screen can be further stabilized.

In the aforementioned display screen support mechanism having the rectangular hole portion, the base support member formed with the rectangular second hole portion is preferably mounted on the base. According to this structure, the base support member can be stably mounted on the base.

In the aforementioned display screen support mechanism according to the first aspect, the display screen support member is preferably rotatable about the platelike support shaft serving as the rotating shaft within the angular range of the symmetrical sectoral hole portion while sliding with respect to the support shaft in the state where the end of the platelike support shaft in the longitudinal direction comes into contact with the arcuate inner peripheral surface of the symmetrical sectoral hole portion. According to this structure, the display screen support member can be stably rotated with respect to the support shaft.

In this case, a length, corresponding to the longitudinal direction of the support shaft, of the symmetrical sectoral hole portion is preferably rendered larger than a length of the support shaft in the longitudinal direction, and the display screen support member is preferably rotatable in the angular range of the symmetrical sectoral hole portion in a state where both ends of an upper surface of the platelike support shaft come into contact with the arcuate inner peripheral surface of the symmetrical sectoral hole portion and a lower surface portion of the platelike support shaft does not come into contact with the arcuate inner peripheral surface of the symmetrical sectoral hole portion. According to this structure, frictional resistance of the platelike support shaft to the symmetrical sectoral hole portion can be suppressed dissimilarly to a case where both ends of the upper surface of the support shaft and the lower surface portion of the support shaft come into contact with the inner peripheral surface, and hence the display screen support member can be smoothly rotated.

The aforementioned display screen support mechanism according to the first aspect preferably further comprises a stop member for preventing the support shaft from slipping off the first hole portion and the second hole portion, wherein the support shaft preferably includes a contact portion coming into contact with a surface of the display screen support member or the base support member and a mounting portion for mounting the stop member. According to this structure, the stop member is mounted on the mounting portion of the support shaft, whereby the support shaft can be prevented from slipping off the first hole portion or the second hole portion.

In this case, the contact portion of the support shaft and the stop member mounted on the mounting portion of the support shaft are preferably arranged to hold the display screen support member and the base support member. According to this structure, the screen support member can be rotatably mounted on the base support member by the contact portion of the support shaft and the stop member.

In the aforementioned display screen support mechanism comprising the stop member, the stop member preferably has a T-shape in plan view.

A television set according to a second aspect of the present invention comprises a display screen portion displaying a television image, a platelike support shaft, a display screen support member supporting the display screen portion and having a first hole portion receiving the platelike support shaft and a base support member provided on a side of a base and having a second hole portion receiving the platelike support shaft, wherein at least either one of the first and second hole portions receiving the platelike support shaft is provided in the form of a symmetrical sector formed by connecting two sectoral forward ends which are symmetric with respect to a hole center, and the display screen support member is rotatable about the platelike support shaft serving as a rotating shaft within an angular range of the symmetrical sectoral hole portion in a state where an end of the platelike support shaft in a longitudinal direction comes into contact with an arcuate inner peripheral surface of the symmetrical sectoral hole portion.

In this television set according to the second aspect, as hereinabove described, at least either one of the first and second hole portions receiving the platelike support shaft is provided in the form of the symmetrical sector formed by connecting the two sectoral forward ends which are symmetric with respect to the hole center, and the display screen support member is rotatable about the platelike support shaft serving as the rotating shaft within the angular range of the symmetrical sectoral hole portion in the state where the end of the platelike support shaft in the longitudinal direction comes into contact with the arcuate inner peripheral surface of the symmetrical sectoral hole portion, whereby the display screen support member rotates about the portion of the support shaft corresponding to the hole center of the symmetrical sectoral hole portion dissimilarly to a case where the hole portion of the display screen support member is provided in the form of the sector. Thus, a maximum moment applied to the support shaft in rotating the display screen support member is a product of a distance between the vicinity of the central portion, serving as the rotation center, of the support shaft corresponding to the symmetrical sectoral hole center and an end of the support shaft in the longitudinal direction and force, and hence the maximum moment (product of the distance between the both ends of the support shaft in the longitudinal direction and the force) acting on the support shaft is substantially reduced by half in a case where the rotation center is the end of the support shaft. Consequently, the support shaft can be inhibited from damage, and hence durability of the support shaft can be improved.

In this case, the display screen support member is preferably rotatable about a rotation center which is in the vicinity of a central portion of the platelike support shaft corresponding to the hole center of the symmetrical sectoral hole portion within the angular range of the symmetrical sectoral hole portion. According to this structure, the rotational angular range of the display screen support member can be easily set by arbitrarily setting the angular range of the symmetrical sectoral hole portion.

In the aforementioned television set according to the second aspect, the display screen support member is preferably rotatable about the platelike support shaft serving as a rotating shaft in a state where both ends of an upper surface of the platelike support shaft come into contact with the arcuate inner peripheral surface of the symmetrical sectoral hole portion. According to this structure, the vertical load of the display screen is applied to the both ends of the upper surface of the platelike support shaft in any of the rotational angular range of the display screen support member, and hence the rotating operation of the display screen can be stabilized.

In the aforementioned television set according to the second aspect, a thickness of the platelike support shaft and a length of the support shaft on the hole center of the symmetrical sectoral hole portion in a thickness direction are preferably substantially the same. According to this structure, the rotating operation of the display screen can be stabilized.

In the aforementioned television set according to the second aspect, either one of the first hole portion and the second hole portion is preferably provided in the form of the symmetrical sector and the other is provided in the form of a rectangle for regulating rotation of the platelike support shaft. According to this structure, the rotating operation of the display screen can be stabilized.

In this case, the display screen support member is preferably rotatable about the platelike support shaft serving as the rotating shaft in a state where both ends of an upper surface of the platelike support shaft come into contact with the arcuate inner peripheral surface of the symmetrical sectoral hole portion, and a lower surface of the platelike support shaft comes into contact with the rectangular hole portion. According to this structure, rotation of the support shaft can be regulated by the rectangular hole portion of the base support member and hence the rotating operation of the display screen can be further stabilized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a display screen support mechanism 1 according to an embodiment of the present invention will be now described with reference to FIGS. 1 to 11.

Figure 1:
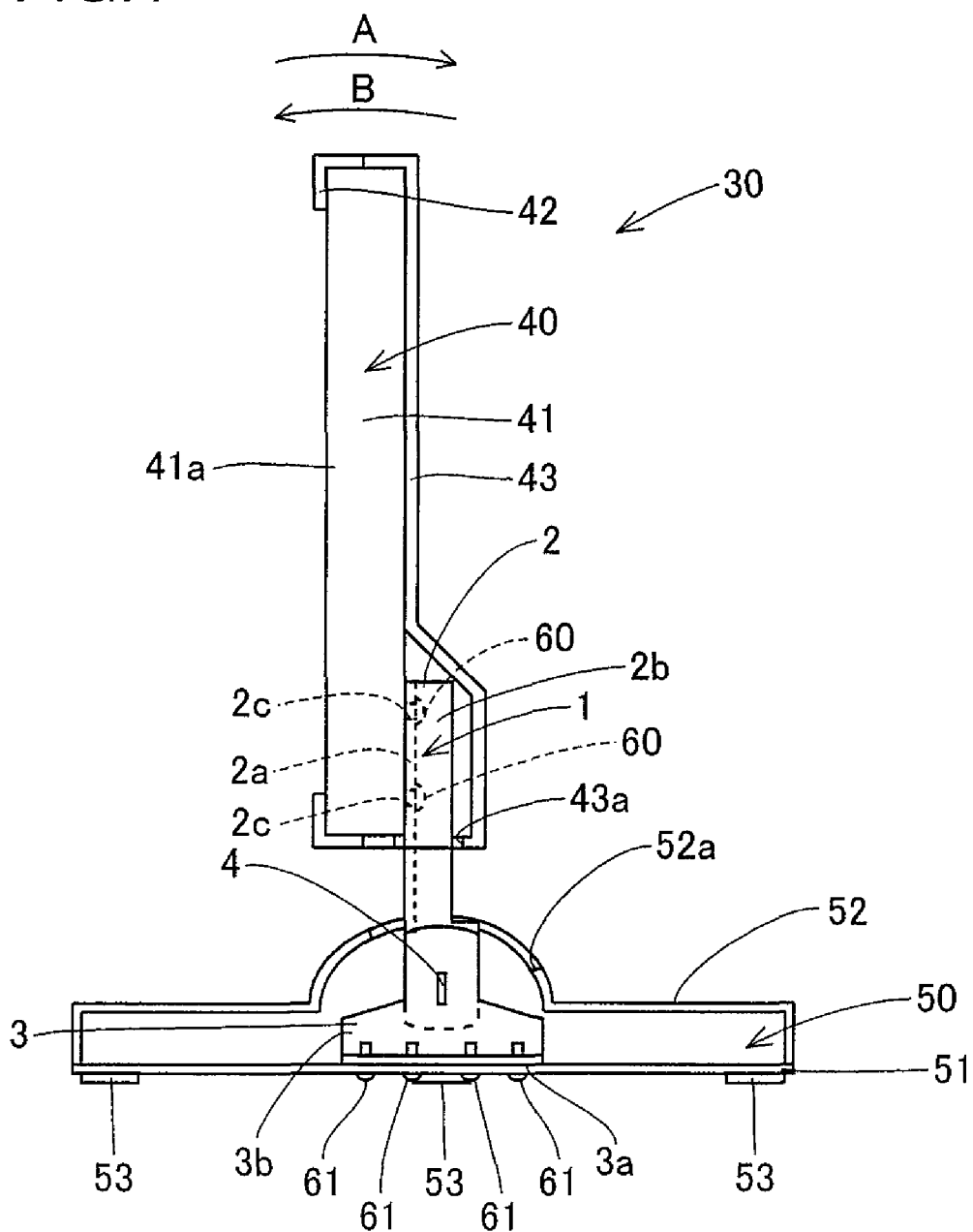
FIG. 1 is a side elevational view showing an overall structure of a liquid crystal television set provided with a display screen support mechanism according to an embodiment of the present invention.

The display screen support mechanism 1 according to the embodiment of the present invention comprises a liquid crystal display portion support member 2, a pair of base support members 3, platelike support shafts 4 made of sheet metal and stop members 5 made of sheet metal (see FIG. 2), as shown in FIG. 1. The liquid crystal display portion support member 2 is an example of the "display screen support member" in the present invention. The display screen support mechanism 1 is provided for supporting a liquid crystal display portion 40 of a liquid crystal television set 30 and mounted on a base 50. The liquid crystal display portion 40 is an example of the "display screen portion" in the present invention. This display screen support mechanism 1 is formed to be capable of supporting the liquid crystal display portion 40 in a state of inclining the liquid crystal display portion 40 by a prescribed angle in an anteroposterior direction with respect to the base 50.

Figure 2:
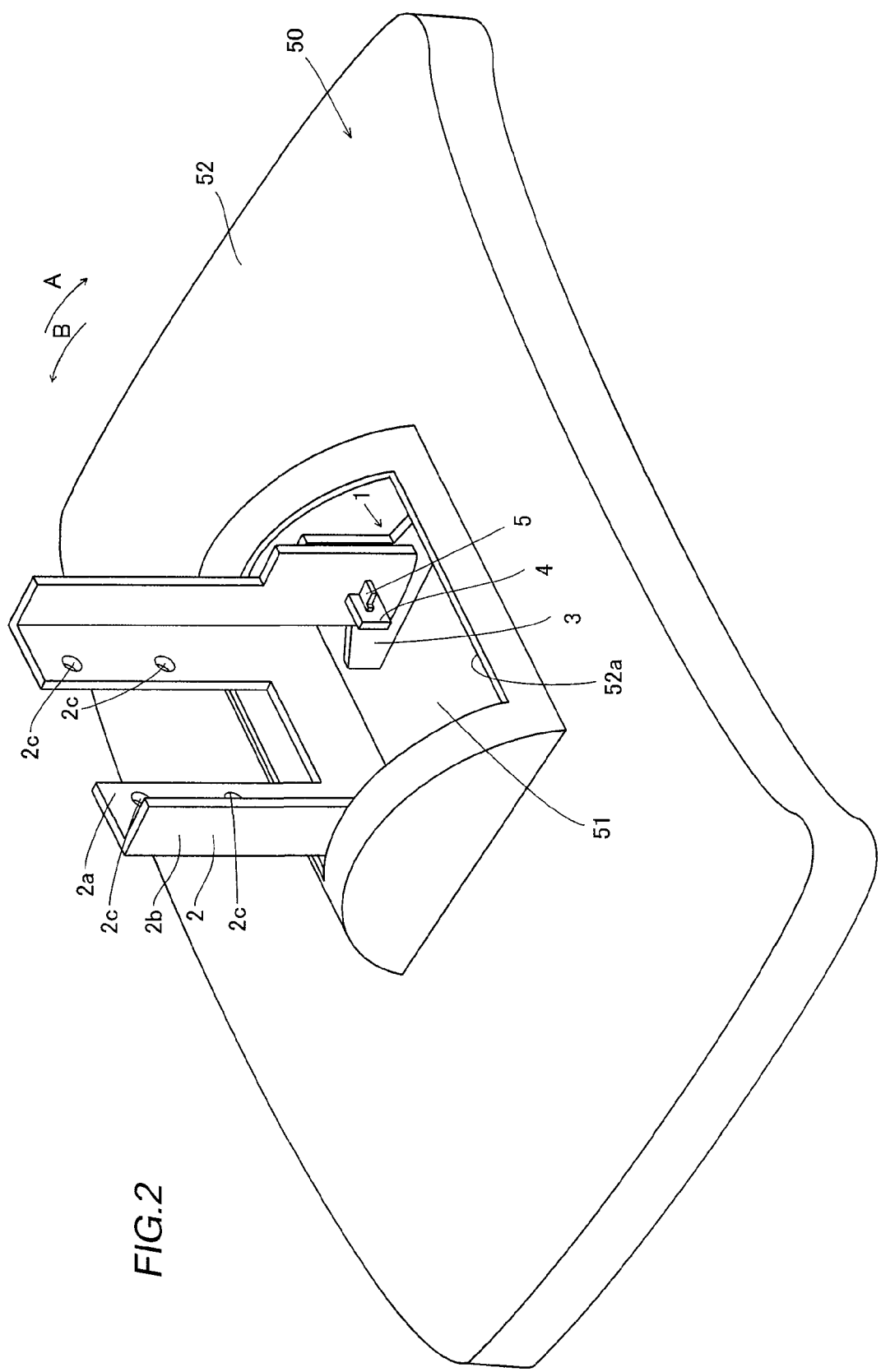
FIG. 2 is a perspective view showing the liquid crystal television set according to the embodiment of the present invention shown in FIG. 1, with a liquid crystal display portion removed.
Figure 3:
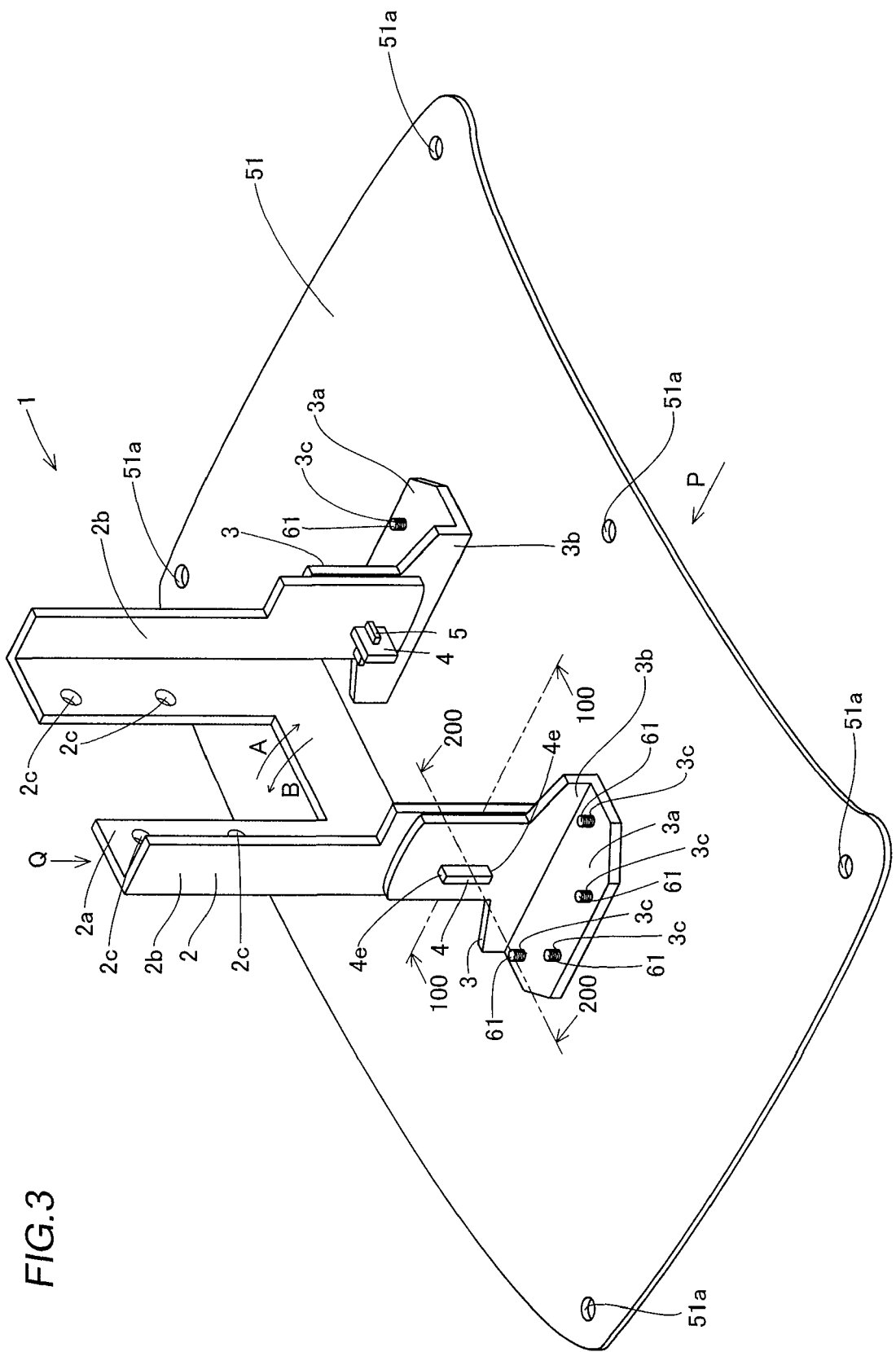
FIG. 3 is a perspective view showing an overall structure of the display screen support mechanism according to the embodiment of the present invention shown in FIG. 1.
Figure 4:
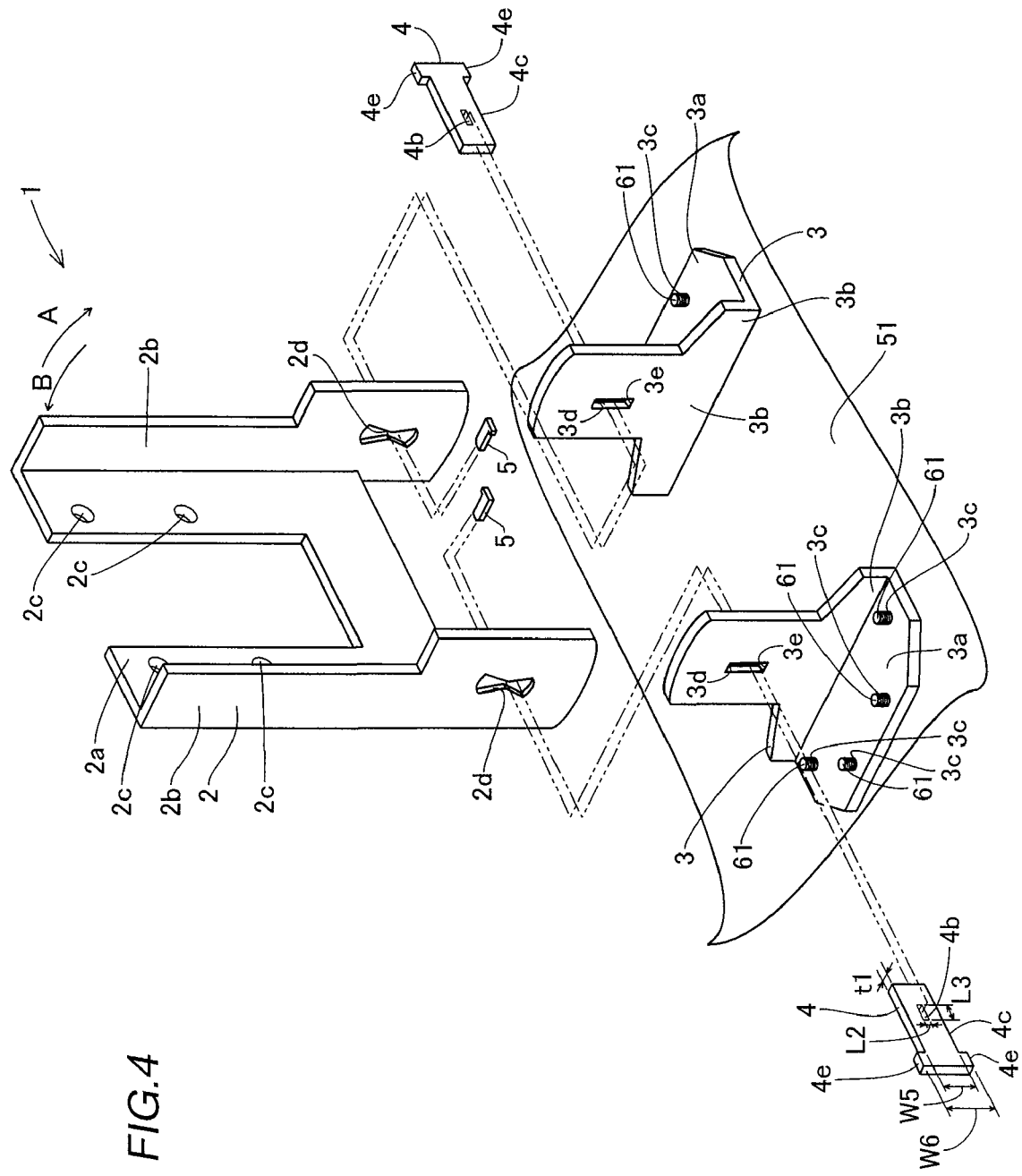
FIG. 4 is an exploded perspective view showing the overall structure of the display screen support mechanism according to the embodiment of the present invention shown in FIG. 3.

The liquid crystal display portion support member 2 includes a display mounting portion 2a and a pair of rotational portions 2b, as shown in FIGS. 2 to 4. The display mounting portion 2a of the liquid crystal display portion support member 2 is provided with four screw receiving holes 2c. The pair of rotational portions 2b of the liquid crystal display portion support member 2 are so provided as to extend from both side ends of the display mounting portion 2a perpendicularly to the surface thereof respectively.

Figure 7:
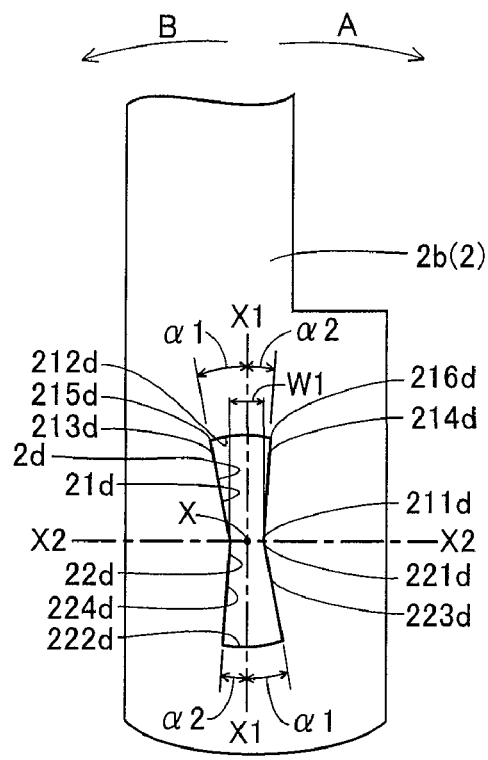
FIG. 7 is a front elevational view of a liquid crystal display portion support member of the display screen support mechanism according to the embodiment of the present invention shown in FIG. 3.
Figure 10:
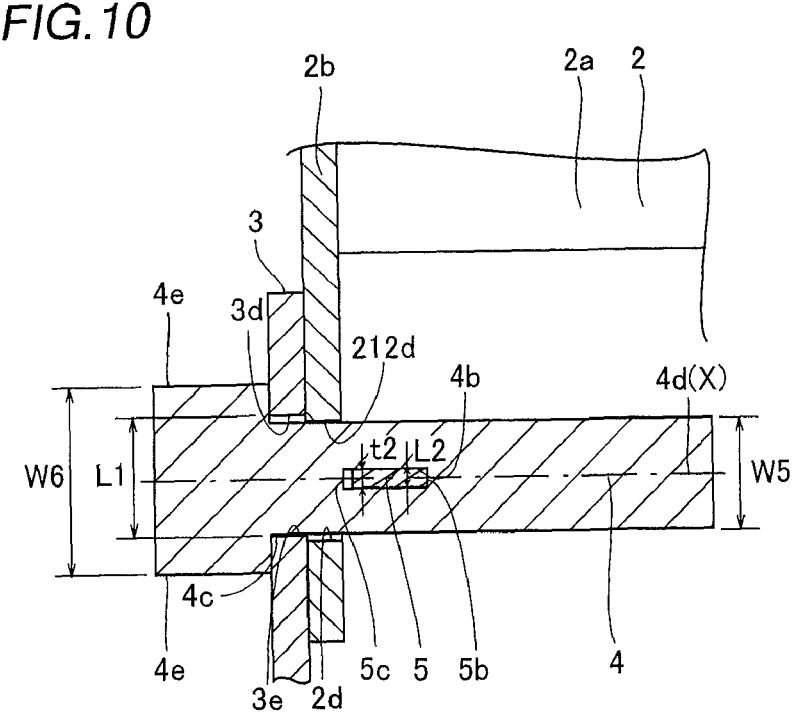
FIG. 10 is a sectional view taken along the line 200-200 in FIG. 3.

According to this embodiment, a pair of symmetrical sectoral hole portions 2d are formed in the vicinity of lower ends of the pair of rotational portions 2b of the liquid crystal display portion support member 2, as shown in FIG. 4. The symmetrical sectoral hole portions 2d are examples of the "first hole portion" in the present invention. These symmetrical sectoral hole portions 2d are provided for receiving the platelike support shafts 4, as shown in FIGS. 4 and 10. Each symmetrical sectoral hole portion 2d is formed by a sectoral first hole portion 21d and a sectoral second hole portion 22d, as shown in FIG. 7. Each sectoral first hole portion 21d is formed by a forward end 211d and an arcuate inner peripheral surface 212d, and the inner peripheral surface 212d is located on an upper side. Each sectoral second hole portion 22d is formed by a forward end 221d and an arcuate inner peripheral surface 222d, and the inner peripheral surface 222d is located on a lower side. In other words, according to this embodiment, each symmetrical sectoral hole portion 2d is so formed that the forward end 211d of the sectoral first hole portion 21d and the forward end 221d of the sectoral second hole portion 22d are connected to each other.

Figure 6:
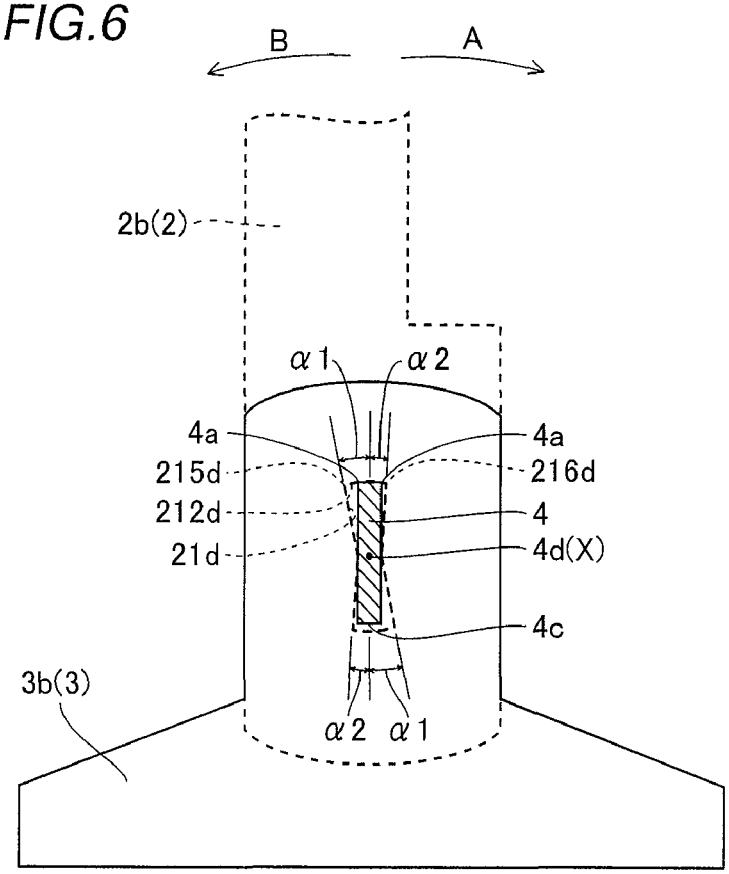
FIG. 6 is a sectional view taken along the line 100-100 in FIG. 3.

According to this embodiment, a length, corresponding to a longitudinal direction of the support shafts 4, of the symmetrical sectoral hole portions 2d is rendered larger than a length L1 of the support shafts 4 in the longitudinal direction, as shown in FIG. 6. Two corners 4a (both ends) of an upper end surface of each platelike support shaft 4 are formed to be rotatable in a state of coming into contact with two portions of the arcuate inner peripheral surface 212d of the sectoral first hole portion 21d of each symmetrical sectoral hole portion 2d. Thus, the two corners 4a (both ends) receive the vertical load of the liquid crystal display portion 40 (see FIG. 1) through the liquid crystal display portion support member 2. The two corners 4a of each support shaft 4 are rotatable until coming into contact with a corner 215d of the sectoral first hole portion 21d or a corner 216d of the sectoral first hole portion 21d respectively when the liquid crystal display portion support member 2 is rotated along arrow A or B. A lower surface portion 4c of each platelike support shaft 4 is formed as to be rotatable in a state where the lower surface portion 4c does not come into contact with the arcuate inner peripheral surface 222d of the sectoral second hole portion 22d of the symmetrical sectoral hole portion 2d.

As shown in FIG. 7, the sectoral first hole portion 21d and the sectoral second hole portion 22d of each symmetrical sectoral hole portion 2d are point-symmetrically arranged with respect to a hole center (central point X formed by intersecting a centerline X1 and a centerline X2). The sectoral first hole portion 21d and the sectoral second hole portion 22d have a central angle α1 (10 degrees) opening in a first direction with respect to the centerline X1 and a central angle α2 (2.5 degrees) opening in a second direction. More specifically, the central angle α1 formed by the centerline X1 of the sectoral first hole portion 21d and an inner side surface 213d and the central angle α1 formed by the centerline X1 of the sectoral second hole portion 22d and an inner side surface 223d are the same angle (10 degrees). The central angle α2 formed by the centerline X1 of the sectoral first hole portion 21d and an inner side surface 214d and the central angle α2 formed by the centerline X1 of the sectoral second hole portion 22d and an inner side surface 224d are the same angle (2.5 degrees). Thus, the liquid crystal display portion 40 of the liquid crystal television set 30 can be inclined by 10 degrees along arrow A (backward) and inclined by 2.5 degrees along arrow B (forward). According to this embodiment, the liquid crystal display portion support member 2 is rotatable about rotation centers 4d (X) which are in the vicinity of central portions of the platelike support shafts 4 corresponding to the hole centers (central point X formed by intersecting the centerline X1 and the centerline X2) of the symmetrical sectoral hole portions 2d within an angular range (α1+α2=12.5 degrees in this embodiment) of the symmetrical sectoral hole portions 2d.

According to this embodiment, a thickness t1 (see FIG. 4) of the support shafts 4 described later and a length W1 (see FIG. 7) of the hole centers (central point X formed by intersecting the centerline X1 and the centerline X2) of the symmetrical sectoral hole portions 2d in a thickness direction (direction of the centerline X2) of the support shafts 4 are substantially the same.

The pair of base support members 3 include base mounting portions 3a and rotating portion mounting portions 3b respectively, as shown in FIGS. 3 and 4. The base mounting portions 3a of the base support members 3 are provided with four screw receiving holes 3c. The rotating portion mounting portions 3b of the base support members 3 are so provided as to extend vertically upward with respect to surfaces of the base mounting portions 3a from first ends of the base mounting portions 3a.

Figure 8:
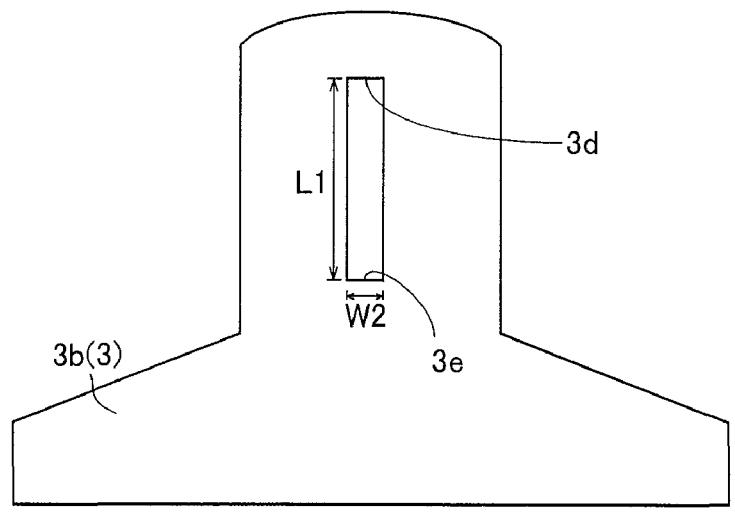
FIG. 8 is a front elevational view of a base support member of the display screen support mechanism according to the embodiment of the present invention shown in FIG. 3.

According to this embodiment, the rotating portion mounting portions 3b of the base support members 3 are formed with rectangular hole portions 3d for regulating rotation of platelike support shafts 4, as shown in FIG. 8. The rectangular hole portions 3d are examples of the "second hole portion" in the present invention. The rectangular hole portions 3d are provided for receiving the platelike support shafts 4 as shown in FIGS. 4 and 10. As shown in FIG. 8, the length L1 of the rectangular hole portions 3d is rendered larger than a width W2.

Each platelike support shaft 4 made of sheet metal includes a pair of contact portions 4e, a rectangular hole portion 4b and the lower surface portion 4c as shown in FIGS. 3 and 4. The hole portion 4b is an example of the "mounting portion" in the present invention. The pair of contact portions 4e of the support shaft 4 are provided to protrude from the rear ends of both side surfaces, extending in a longitudinal direction, of the support shaft 4. These contact portions 4e are in contact with the surfaces of the base support member 3. The rectangular hole portion 4b of the support shaft 4 is so provided as to receive the corresponding stop member 5, as shown in FIGS. 4 and 9 to 11. A length L2 (see FIG. 4) of the rectangular hole portion 4b in a short-side direction is substantially the same as a thickness t2 (see FIG. 5) of the stop members 5 described later. A length L3 (see FIG. 4) of the hole portion 4b in the longitudinal direction is rendered larger than a width W3 (see FIG. 5) of the stop members 5 and smaller than a width W4 (see FIG. 5).

As shown in FIG. 10, the lower surface portion 4c of the support shaft 4 is formed to come into contact with a lower surface portion 3e of the rectangular hole portion 3d. Thus, the liquid crystal display portion support member 2 is rotatable (slidable) about the platelike support shafts 4 serving as rotating shafts in a state where the corners 4a of the upper surfaces of the platelike support shafts 4 come into contact with the arcuate inner peripheral surfaces 212d of the symmetrical sectoral hole portions 2d and the lower surface portions 4c of the platelike support shafts 4 come into contact with the rectangular hole portions 3d. A width W5 of the support shafts 4 is rendered slightly smaller than the length L1 of the rectangular hole portions 3d. A width W6 of the support shafts 4 is rendered larger than the length L1 of the rectangular hole portions 3d. Thus, the support shafts 4 are positioned at prescribed positions with respect to the hole portions 3d when the support shafts 4 are inserted into the rectangular hole portions 3d. The thickness t1 (see FIG. 4) of the support shafts 4 is rendered slightly smaller than the width W2 (see FIG. 8) of the hole portions 3d. Thus, the lower surface portions 3e of the rectangular hole portions 3d receive the vertical load of the liquid crystal display portion 40 through the liquid crystal display portion support member 2 and the support shafts 4, as shown in FIG. 10. In other words, the inner peripheral surfaces 212d of the sectoral first hole portions 21d of the symmetrical sectoral hole portions 2d of the liquid crystal display portion support member 2, the lower surface portions 3e of the base support members 3 and the support shafts 4 receive the vertical load of the liquid crystal display portion 40.

Figure 5:
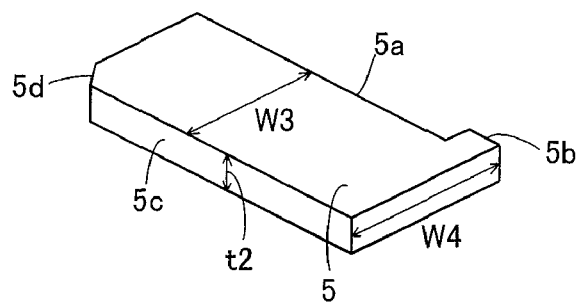
FIG. 5 is a perspective view showing a stop member of the display screen support mechanism according to the embodiment of the present invention shown in FIG. 3.
Figure 9:
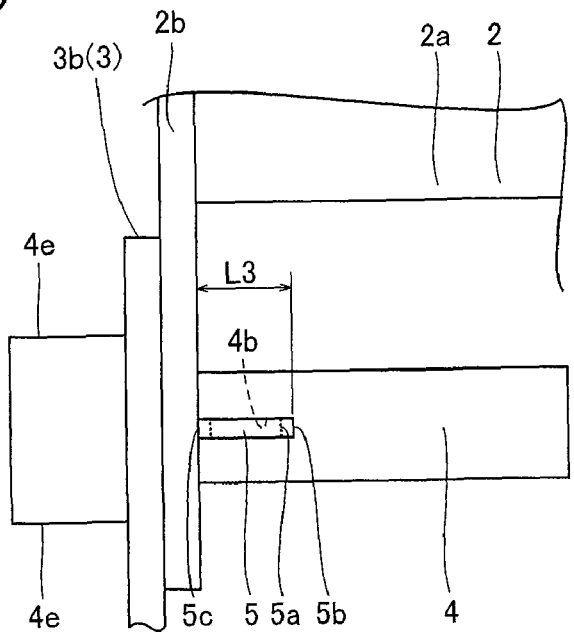
FIG. 9 is a diagram partially showing a state as viewed along arrow P in FIG. 3.
Figure 11:
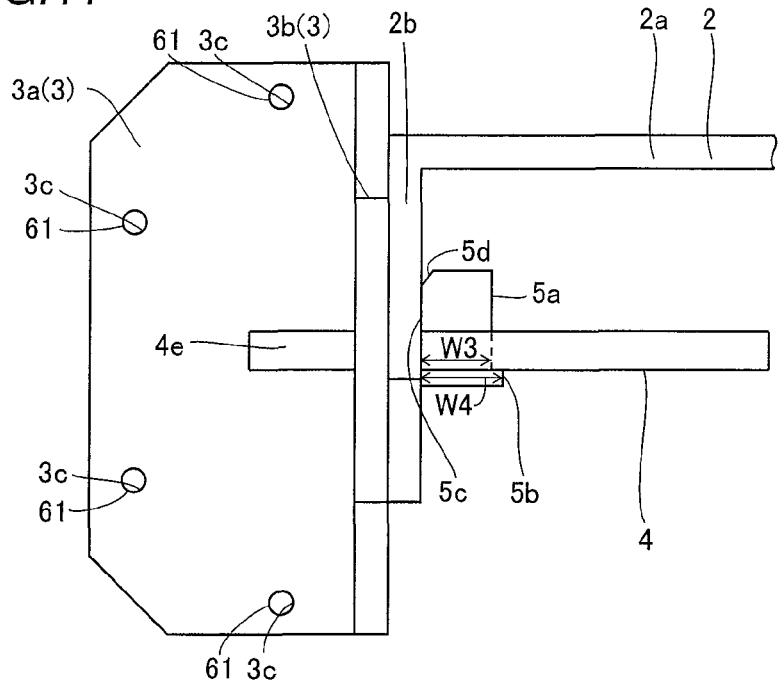
FIG. 11 is a diagram partially showing a state as viewed along arrow Q in FIG. 3.

As shown in FIG. 5, the stop members 5 made of sheet metal are in the form of plates and have T-shapes in plan view. Each stop member 5 includes a first side surface 5a extending in a longitudinal direction, a contact portion 5b provided to protrude with respect to the first side surface 5a and a chamfer 5d provided on a second side surface 5c. The stop member 5 is inserted into the hole portion 4b of the support shafts 4 in a state where the liquid crystal display portion support member 2 and the base support member 3 are held between the contact portion 4e of the support shaft 4 and the second surface 5c, as shown in FIGS. 9 to 11. The width W4 (see FIG. 5) of the stop members 5 is rendered larger than the length L3 (see FIG. 4) of the hole portion 4b of the support shafts 4 in the longitudinal direction. The contact portion 5b is provided for inhibiting the stop member 5 from slipping off the hole portion 4b of the support shafts 4 by bringing the contact portion 5b into contact with the surface of the support shaft 4 when the stop member 5 is inserted into the hole portion 4b of the support shaft 4. The chamfer 5d is provided for easily inserting the stop member 5 into the hole portion 4b of the support shaft 4.

The liquid crystal display portion 40 includes a liquid crystal module 41 including a liquid crystal screen 41a, a front cabinet 42 and a rear cabinet 43 as shown in FIG. 1. Screws 60 are so threaded into screw mounting holes (not shown) through the screw receiving holes 2c of the liquid crystal display portion support member 2 as to mount the liquid crystal module 41 of the liquid crystal display portion 40 on the liquid crystal display portion support member 2. The rear cabinet 43 is provided with a notched portion 43a for arranging the liquid crystal display portion support member 2.

The base 50 includes a base body 51, a cover member 52 and support legs 53, as shown in FIGS. 1 and 2. The base support members 3 are mounted on the base body 51 of the base 50 by fastening screws 61 to the screw mounting holes 3c of the base support members 3 through screw receiving holes (not shown) of the base body 51 from the side of the bottom surface. The cover member 52 of the base 50 is mounted on the base body 51 by fastening screws to the screw mounting holes (not shown) of the cover member 52 through screw receiving holes 51a of the base body 51 from the side of the bottom surface. The cover member 52 is provided with a notched portion 52a for arranging the liquid crystal display portion support member 2. This notched portion 52a is so formed that the liquid crystal display portion support member 2 and the cover member 52 come into contact with each other when the liquid crystal display portion 40 rotates by 10 degrees along arrow A or 2.5 degrees along arrow B. The support legs 53 are mounted on a bottom surface of the base body 51.

The rotating operations of the display screen support mechanism 1 according to the embodiment of the present invention will be now described with reference to FIGS. 1, 6, 12 and 13.

Figure 12:
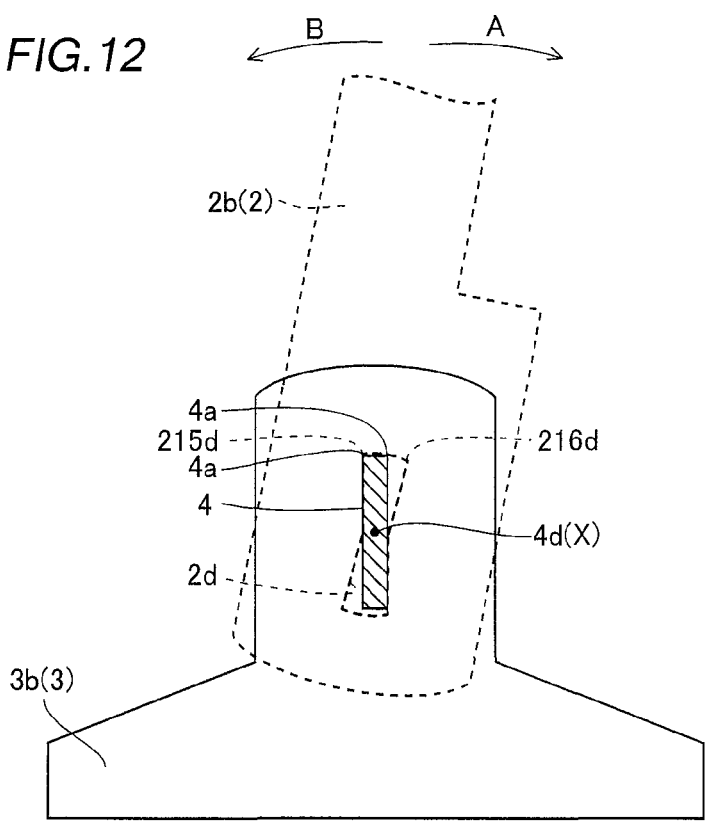
FIGS. 12 and 13 are sectional views for illustrating rotation of the display screen support mechanism according to the embodiment of the present invention shown in FIG. 3.

First, a user presses the liquid crystal display portion 40 (see FIG. 1) along arrow A (backward) from a state where the liquid crystal display portion support member 2 shown in FIG. 6 is vertically supported. In this case, the liquid crystal display portion support member 2 is rotated along arrow A (backward) about the rotation centers 4d (X) corresponding to the hole centers X of the symmetrical sectoral hole portions 2d of the support shafts 4 mounting the liquid crystal display portion support member 2 on the base support members 3, while the inner peripheral surface 212d of each symmetrical sectoral hole portion 2d of the liquid crystal display portion support member 2 and the two corners 4a of the upper surface of the corresponding support shaft 4 come into contact with each other. When the liquid crystal display portion support member 2 and the support shafts 4 are rotated by 10 degrees (angle $\alpha 1$), the corners 4a of the support shafts 4 come into contact with the corners 215d of the symmetrical sectoral hole portions 2d of the base support members 3 to stop rotating along arrow A, as shown in FIG. 12. Thus, the liquid crystal display portion 40 of the liquid crystal television set 30 are upward by 10 degrees.

Figure 13:
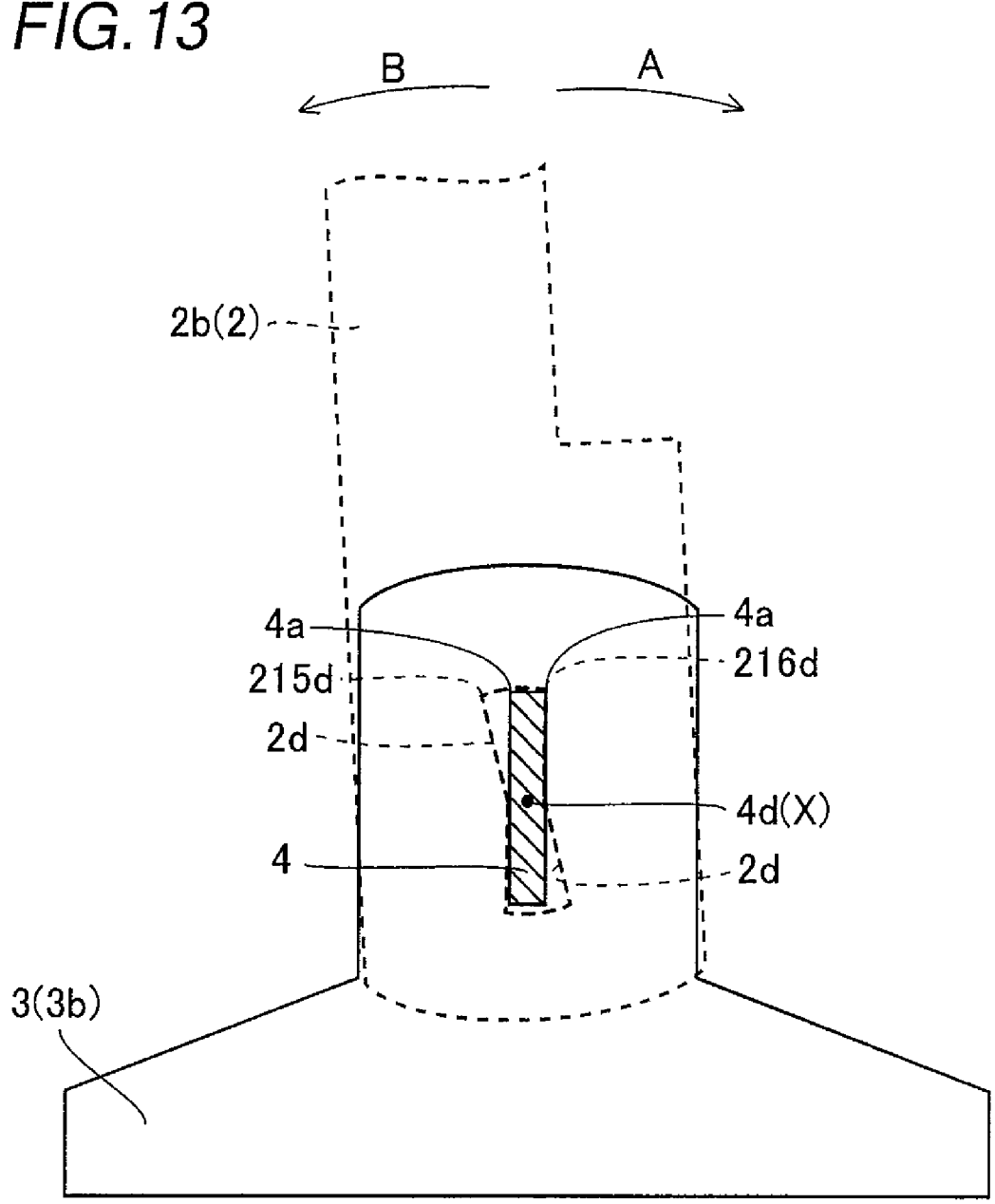

The user presses the liquid crystal display portion 40 (see FIG. 1) along arrow B (backward) from a state where the liquid crystal display portion support member 2 shown in FIG. 6 is vertically supported. In this case, the liquid crystal display portion support member 2 is rotated along arrow B (forward) about the rotation centers 4d (X) corresponding to the hole centers X of the symmetrical sectoral hole portions 2d of the support shafts 4 mounting the liquid crystal display portion support member 2 on the base support members 3, while the inner peripheral surface 212d of each symmetrical sectoral hole portion 2d of the liquid crystal display portion support member 2 and the two corners 4a of the upper surface of the corresponding support shaft 4 come into contact with each other. When the liquid crystal display portion support member 2 and the support shafts 4 are rotated by 2.5 degrees (angle $\alpha 2$), the corners 4a of the support shafts 4 come into contact with the corners 216d of the symmetrical sectoral hole portions 2d of the base support members 3 to stop rotating along arrow B, as shown in FIG. 13. Thus, the liquid crystal display portion 40 of the liquid crystal television set 30 are downward by 2.5 degrees.

According to this embodiment, as hereinabove described, the first hole portion receiving each platelike support shaft 4 is provided in the form of a symmetrical sector formed by connecting the forward ends 211d and 221d of the two sectoral first and second hole portions 21d and 22d which are symmetric with respect to the hole center and the liquid crystal display portion support member 2 is rendered rotatable about the platelike support shaft 4 serving as the rotating shaft within the angular range ($\alpha 1+\alpha 2=12.5$ degrees in this embodiment) of each symmetrical sectoral hole portion 2d in a state where the two corners 4a of each platelike support shaft 4 come into contact with the arcuate inner peripheral surface 212d of the symmetrical sectoral hole portion 2d, whereby the liquid crystal display portion support member 2 rotates about the portion, serving as the rotation center 4d (X), corresponding to the hole center X of the symmetrical sectoral hole portion 2d of each support shaft 4 dissimilarly to a case where the hole portions of the liquid crystal display portion support member 2 are provided in the form of the sectors. Thus, a maximum moment applied to the support shafts 4 in a case of bringing the inner side surfaces of the hole portions 2d into contact with the support shafts 4 in rotating the liquid crystal display portion support member 2 is a product of a distance between the vicinity of the central portions, serving as the rotation centers 4d (X), of the support shafts 4 corresponding to the symmetrical sectoral hole centers X and ends of the support shafts 4 in the longitudinal direction and force, and hence the maximum moment (product of the distance between the both ends of the support shafts 4 in the longitudinal direction and the force) acting on the support shafts 4 is substantially reduced by half in a case where the rotation centers 4d (X) are the ends of the support shafts 4. Consequently, the support shafts 4 can be inhibited from damage, and hence durability of the support shafts 4 can be improved.

According to this embodiment, as hereinabove described, the liquid crystal display portion support member 2 is rendered rotatable about the rotation centers 4d (X) which are in the vicinity of the central portions of the platelike support shafts 4 corresponding to the hole centers X of the symmetrical sectoral hole portions 2d within the angular range ($\alpha 1+\alpha 2=12.5$ degrees in this embodiment) of the symmetrical sectoral hole portions 2d, whereby the rotational angular range of the liquid crystal display portion support member 2 can be easily set by arbitrarily setting the angular range of the symmetrical sectoral hole portions 2d.

According to this embodiment, as hereinabove described, the liquid crystal display portion support member 2 is rendered rotatable about the platelike support shafts 4 serving as the rotating shafts in a state where the two corners 4a of the upper surface of each platelike support shaft 4 come into contact with the arcuate inner peripheral surface 212d of the symmetrical sectoral hole portion 2d, whereby the vertical load of the liquid crystal display portion 40 is applied to the two corners 4a of the upper surface of each platelike support shaft 4 in any of the rotational angular range ($\alpha 1+\alpha 2=12.5$ degrees in this embodiment) of the liquid crystal display portion support member 2, and hence the rotating operation of the liquid crystal display portion 40 can be stabilized.

According to this embodiment, as hereinabove described, the thickness of the platelike support shafts 4 and the length of the hole centers X of the symmetrical sectoral hole portions 2d in the thickness direction of the support shafts 4 are substantially the same, whereby the rotating operation of the liquid crystal display portion 40 can be stabilized.

According to this embodiment, as hereinabove described, the first hole portions are provided in the form of the symmetrical sectors and the second hole portions are provided in the form of the rectangles for regulating rotation of the platelike support shafts 4, whereby the rotating operation of the liquid crystal display portion 40 can be stabilized.

According to this embodiment, as hereinabove described, the liquid crystal display portion support member 2 is rendered rotatable about the platelike support shafts 4 serving as the rotating shafts in a state where the corners 4a of the upper surfaces of the platelike support shafts 4 come into contact with the arcuate inner peripheral surfaces 212d of the symmetrical sectoral hole portions 2d and the lower surface portions 4c of the platelike support shafts 4 come into contact with the rectangular hole portions 3d, whereby the rotation of the support shafts 4 can be regulated by the rectangular hole portions 3d and hence the liquid crystal display portion support member 2 can be stably rotated about the support shafts 4 serving as the rotating shaft.

According to this embodiment, as hereinabove described, the corners 4a of the upper surfaces of the platelike support shafts 4 come into contact with the upper arcuate inner peripheral surfaces 212d of the symmetrical sectoral hole portions 2d and the lower surface portions 4c of the platelike support shafts 4 come into contact with the lower surfaces of the rectangular hole portions 3d, so that the lower surface portions 3e of the rectangular hole portions 3d receive the load of the liquid crystal display portion 40, whereby the liquid crystal display portion support member 2 can be stably rotated about the support shafts 4 serving as the rotating shaft while supporting the liquid crystal display portion 40 by the lower surface portions 3e of the rectangular hole portions 3d.

According to this embodiment, as hereinabove described, the hole portions of the liquid crystal display portion support member 2 are provided in the form of symmetrical sectors while the hole portions of the base support members 3 are provided in the form of the rectangles, whereby rotation of the support shafts 4 can be regulated by the rectangular hole portions 3d of the base support member 3, and hence the liquid crystal display portion 40 can be further stably rotated.

According to this embodiment, as hereinabove described, the base support members 3 formed with the rectangular hole portions 3d are mounted on the base 50, whereby the base support members 3 can be stably mounted on the base 50.

According to this embodiment, as hereinabove described, the liquid crystal display portion support member 2 is rendered rotatable about the platelike support shafts 4 serving as the rotating shafts 4 in the angular range of the symmetrical sectoral hole portions 2d while sliding with respect to the support shafts 4 in a state where the corners 4a of the platelike support shafts 4 in the longitudinal direction come into contact with the arcuate inner peripheral surfaces 212d of the symmetrical sectoral hole portions 2d, whereby the liquid crystal display portion support member 2 can be stably rotated with respect to the support shafts 4.

According to this embodiment, as hereinabove described, the length, corresponding to the longitudinal direction of the support shafts 4, of the symmetrical sectoral hole portions 2d is rendered larger than the length L1 of the support shafts 4 in the longitudinal direction, and the liquid crystal display portion support member 2 is rendered rotatable in the angular range of the symmetrical sectoral hole portions 2d in a state where the corners 4a of the upper surfaces of the platelike support shafts 4 come into contact with the arcuate inner peripheral surfaces 212d of the symmetrical sectoral hole portions 2d and the lower surface portions 4c of the platelike support shafts 4 do not come into contact with the arcuate inner peripheral surfaces 212d of the symmetrical sectoral hole portions 2d, whereby frictional resistance of the platelike support shafts 4 to the symmetrical sectoral hole portions 2d can be suppressed dissimilarly to a case where the corners 4a of the upper surfaces of the support shafts 4 and the lower surface portions 4c of the support shafts 4 come into contact with the inner peripheral surfaces 212d, and hence the liquid crystal display portion support member 2 can be smoothly rotated.

According to this embodiment, as hereinabove described, the support shafts 4 include the contact portions 4e coming into contact with the liquid crystal display portion support member 2 or the surfaces of the base support members 3 and the hole portions 4b for mounting the stop members 5, whereby the stop members 5 are mounted on the hole portions 4b of the support shafts 4, whereby the support shafts 4 can be prevented from slipping off the symmetrical sectoral hole portions 2d and the rectangular hole portions 3d.

According to this embodiment, as hereinabove described, the contact portions 4e of the support shafts 4 and the stop members 5 mounted in the hole portions 4b of the support shafts 4 are arranged to hold the liquid crystal display portion support member 2 and the base support members 3, whereby the liquid crystal display portion support member 2 can be rotatably mounted on the base support members 3 by the contact portions 4e of the support shafts 4 and the stop members 5.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen support mechanism is provided on the liquid crystal television set employed in the aforementioned embodiment, the present invention is not restricted to this but the display screen support mechanism may alternatively be provided on a display such as an organic EL display or a plasma panel display other than the liquid crystal television set.

While the first hole portions are provided in the form of the symmetrical sectors and the second hole portions are provided in the form of the rectangles in the aforementioned embodiment, the present invention is not restricted but the first hole portions may be provided in the form of the rectangles and the second hole portions may be provided in the form of the symmetrical sectors.

While the first sectoral hole portions and the second sectoral hole portions of the symmetrical sectoral hole portions of the liquid crystal display portion support member are formed to have 10 degrees (angle $\alpha 1$) in the first direction and 2.5 degrees (angle $\alpha 2$) in the second direction from the centerline X1 respectively in the aforementioned embodiment, the present invention is not restricted but the first sectoral hole portions and the second sectoral hole portions of the symmetrical sectoral hole portions of the liquid crystal display portion support member may be formed to have angles other than 10 degrees (angle $\alpha 1$) in the first direction and 2.5 degrees (angle $\alpha 2$) in the second direction from the centerline X1.

What is claimed is:

1. A display screen support mechanism comprising:
   a platelike support shaft;
   a display screen support member supporting a display screen portion and having a first hole portion receiving said platelike support shaft; and
   a base support member provided on a side of a base and having a second hole portion receiving said platelike support shaft, wherein
   at least one of said first and second hole portions receiving said platelike support shaft has a shape including two adjoining sector shapes, with straight sides of one of the two adjoining sector shapes meeting straight sides of the other of the two adjoining sector shapes at the join of the two adjoining sector shapes, and said display screen support member is rotatable about said platelike support shaft serving as a rotating shaft within an angular range of said two adjoining sector shapes in a state where an end of said platelike support shaft in a longitudinal direction comes into contact with an arcuate inner peripheral surface of said two adjoining sector shapes.

2. The display screen support mechanism according to claim 1, wherein
   said display screen support member is rotatable about a rotation center which is in the vicinity of a central portion of said platelike support shaft within the angular range of said two adjoining sector shapes.

3. The display screen support mechanism according to claim 1, wherein
   said display screen support member is rotatable about said platelike support shaft serving as a rotating shaft in a state where both ends of an upper surface of said platelike support shaft come into contact with said arcuate inner peripheral surface of said two adjoining sector shapes.

4. The display screen support mechanism according to claim 1, wherein
a thickness of said platelike support shaft along a front-back direction of said display screen support mechanism and an opening width of the central portion of said two adjoining sector shapes along the front-back direction of said display screen support mechanism are substantially the same.

5. The display screen support mechanism according to claim 1, wherein
one of said first hole portion and said second hole portion is provided in the form of said two adjoining sector shapes and the other is provided in the form of a rectangle for regulating rotation of said platelike support shaft.

6. The display screen support mechanism according to claim 5, wherein
said display screen support member is rotatable about said platelike support shaft serving as the rotating shaft in a state where both ends of an upper surface of said platelike support shaft come into contact with said arcuate inner peripheral surface of said two adjoining sector shapes, and a lower surface of said platelike support shaft comes into contact with said rectangular hole portion.

7. The display screen support mechanism according to claim 5, wherein
both ends of an upper surface of said platelike support shaft come into contact with said arcuate upper inner peripheral surface of said two adjoining sector shapes and a lower surface of said platelike support shaft comes into contact with a lower surface of said rectangular hole portion, so that said lower surface of said rectangular hole portion receives a vertical load of said display screen portion.

8. The display screen support mechanism according to claim 5, wherein
said first hole portion of said display screen support member is provided in the form of said two adjoining sector shapes and said second hole portion of said base support member is provided in the form of said rectangle.

9. The display screen support mechanism according to claim 5, wherein
said second hole portion of said base support member is provided in the form of said rectangle and said base support member formed with said rectangular second hole portion is mounted on said base.

10. The display screen support mechanism according to claim 1, wherein
said display screen support member is rotatable about said platelike support shaft serving as the rotating shaft within the angular range of said two adjoining sector shapes while sliding with respect to said support shaft in the state where said end of said platelike support shaft in the longitudinal direction comes into contact with said arcuate inner peripheral surface of said two adjoining sector shapes.

11. The display screen support mechanism according to claim 10, wherein
a length, corresponding to the longitudinal direction of said support shaft, of said two adjoining sector shapes is rendered larger than a length of said support shaft in the longitudinal direction, and
said display screen support member is rotatable in the angular range of said two adjoining sector shapes in a state where both ends of an upper surface of said platelike support shaft come into contact with said arcuate inner peripheral surface of said two adjoining sector shapes and a lower surface of said platelike support shaft does not come into contact with said arcuate inner peripheral surface of said two adjoining sector shapes.

12. The display screen support mechanism according to claim 1, further comprising a stop member for preventing said support shaft from slipping off said first hole portion and said second hole portion, wherein
said support shaft includes a contact portion coming into contact with a surface of said display screen support member or said base support member and a mounting portion for mounting said stop member.

13. The display screen support mechanism according to claim 12, wherein
said contact portion of said support shaft and said stop member mounted on said mounting portion of said support shaft are arranged to hold said display screen support member and said base support member.

14. The display screen support mechanism according to claim 12, wherein
said stop member has a T-shape in plan view.

15. The display screen support mechanism according to claim 1, wherein
said platelike support shaft is made of metal and has a rectangular cross section,
said display screen support member is rotatable about said platelike support shaft serving as a rotating shaft in a state where both edge portions of upper surface of said platelike support shaft having said rectangular cross section come into contact with an arcuate inner peripheral surface of said two adjoining sector shapes at two points in a state of line contact, and a lower surface of said platelike support shaft having said rectangular cross section is apart from an arcuate inner peripheral surface of said two adjoining sector shapes.

16. A television set comprising:
a display screen portion displaying a television image;
a platelike support shaft;
a display screen support member supporting said display screen portion and having a first hole portion receiving said platelike support shaft; and
a base support member provided on a side of a base and having a second hole portion receiving said platelike support shaft, wherein
at least one of said first and second hole portions receiving said platelike support shaft has a shape including two adjoining sector shapes, with straight sides of one of the two adjoining sector shapes meeting straight sides of the other of the two adjoining sector shapes at the join of the two adjoining sector shapes, and said display screen support member is rotatable about said platelike support shaft serving as a rotating shaft within an angular range of said two adjoining sector shapes in a state where an end of said platelike support shaft in a longitudinal direction comes into contact with an arcuate inner peripheral surface of said two adjoining sector shapes.

17. The television set according to claim 16, wherein
said platelike support shaft is made of metal and has a rectangular cross section,
said display screen support member is rotatable about said platelike support shaft serving as a rotating shaft in a state where both edge portions of upper surface of said platelike support shaft having said rectangular cross section come into contact with an arcuate inner peripheral surface of said two adjoining sector shapes at two points in a state of line contact, and a lower surface of said platelike support shaft having said rectangular cross section is apart from an arcuate inner peripheral surface of said two adjoining sector shapes.

* * * * *